United States Patent [19]
Maddox

[11] Patent Number: 5,003,725
[45] Date of Patent: Apr. 2, 1991

[54] HOLDER FOR A STUFFED TOY ANIMAL FOR USE WITH A FLORAL ARRANGEMENT

[76] Inventor: Ricky R. Maddox, 6271 Bannock Rd., Westminister, Calif. 92683

[21] Appl. No.: 453,604

[22] Filed: Dec. 20, 1989

[51] Int. Cl.⁵ .............................................. A47G 7/02
[52] U.S. Cl. .................................. 47/39; 248/312.1; 446/268
[58] Field of Search ............. 47/41.01, 41.14, 39; 446/72, 73, 74, 75, 268; 248/27.8, 311.2, 312.1, 231

[56] References Cited

U.S. PATENT DOCUMENTS

| | | | |
|---|---|---|---|
| 180,613 | 8/1876 | McCutchins | 446/268 |
| 2,527,152 | 10/1950 | Ransom | 446/268 X |
| 2,749,072 | 6/1959 | Long | 248/312.1 X |
| 3,233,858 | 2/1966 | Benjamin | 248/311.2 |
| 3,273,841 | 9/1966 | Cota | 47/39 X |
| 3,516,632 | 6/1970 | Hall | 446/268 X |
| 4,828,211 | 5/1989 | McConnell | 248/311.2 |

FOREIGN PATENT DOCUMENTS

| | | | |
|---|---|---|---|
| 334339 | 3/1921 | Fed. Rep. of Germany | 446/268 |
| 3439427 | 5/1986 | Fed. Rep. of Germany | 47/79 |
| 18419 | of 1900 | United Kingdom | 446/268 |

*Primary Examiner*—David A. Scherbel
*Assistant Examiner*—Jerrold D. Johnson
*Attorney, Agent, or Firm*—W. Edward Johansen

[57] ABSTRACT

A holder for a stuffed toy animal may be used with a floral arrangement. The floral arrangement includes a vase with an outer surface and a peripheral lip and flowers which are disposed in the vase. The holder includes a back frame, a base platform and two grasping arms. The back frame has a top member, a bottom member and two side members. The base platform is pivotally coupled to the bottom member of the back frame so that it can be folded against the back frame. The stuffed toy animal is placed on the base platform in an upright position relative thereto. One end of each grasping arm is pivotally coupled to one of the two side members of the back frame so that the two grasping arms may either be folded so that they are adjacent to the back frame or be swung out in order to operate together holding the stuffed toy animal in its upright position. The back frame has a pair of ribbon slits which are disposed on the side members thereof and a vase hook which is mechanically coupled to the top member thereof. A ribbon may be threaded through the ribbon slits and around the outer surface of the vase in order to tie the holder to the vase for both delivery and display. The vase hook hooks the peripheral lip of the vase. The vase hook has a screw hole so that once the ribbon has been untied the holder may be mounted on a wall by using a screw through the screw hole so that the vase hook secures the holder to the wall in order to display the stuffed toy animal.

1 Claim, 2 Drawing Sheets

HOLDER FOR A STUFFED TOY ANIMAL FOR USE WITH A FLORAL ARRANGEMENT

BACKGROUND OF THE INVENTION

1. Field of the Invention

This invention relates to stuffed toy animals and floral arrangements and more particularly to a holder for a stuffed toy animal which a ribbon ties to a vase of a floral arrangement for delivery and which, once the ribbon has been untied, may be wall mounted.

2. Description of the Prior Art

A floral arrangement may be sent to an individual for a variety of reasons. The floral arrangement includes a vase and flowers which are disposed within the vase. Often the floral arrangement includes not only flowers, but also a stuffed toy animal. When a stuffed toy animal is included in the floral arrangement it is tied to the vase by a piece of ribbon in order to secure the stuffed toy animal to the vase.

In the prior art there are wall mounted holders for stuffed toy animals. U.S. Pat. No. D-268,155, entitled Wall Mounted Holder for Stuffed Toy Animals, issued to Gary Sumner on Mar. 8, 1983, teaches an ornamental design for a wall mounted holder for stuffed toy animals.

U.S. Pat. No. 4,795,398, entitled Flower Pot Doll, issued to Howard Wexler on Jan. 3, 1989, teaches a doll and flower-in-pot combination which includes a head, a hollow body and a sleeve. The head is pivotally attached to the hollow body which is attached to the sleeve. When the sleeve is folded upon the body and the head is folded down, the doll and flower-in-pot combination appears to be a flower pot. Either raising the head or pulling the sleeve down, or both, produces a doll.

U.S. Pat. No. 4,595,618, entitled Vehicle Seat Belt Accessory, issued to Ronald L. Caringer on June 17, 1986, teaches an accessory which may be used in combination with a vehicle seat belt. The accessory is often characterized as a novelty item, such as a stuffed teddy bear. In an arrangement the accessory is secured to a sleeve through which the vehicle seat belt is selectively introduced. The arrangement serves not only an entertainment purpose but also a safety purpose for a child user. The vehicle seat belt, when secured for use, presents the accessory in a displayed position and/or a lap held position.

U.S. Pat. No. 4,662,107, entitled Combination Flower and Display Container, issued to Jan M. Van Den Kieboom on May 5, 1987, teaches a combination flower and display container which includes an open top housing, an open top vase and a display. The open top housing has a closed bottom wall and a plurality of adjacent upright side walls which extend from the bottom wall defining a vase receiving opening within the open top housing. The open top vase holds flowers and is slidably received within the open top housing in the vase receiving opening. The display has a plurality of indicia thereon one of which is removably positioned between the open top vase and each of the side walls.

U.S. Pat. No. 4,004,367, entitled Decorative Holder for Flower Arrangements, issued to Donald L. O'Connell on Jan. 25, 1977, teaches a decorative holder for flower arrangements which includes a flat decorative backing piece and a substantially water-confining receptacle. The flat decorative backing piece has an opening therein. The substantially water-confining receptacle fits in and extends through the opening.

U.S. Pat. No. 3,661,350, entitled Floral Carrier, issued to Richard C. Eckler and Frank H. Amirault on May 9, 1972, teaches a carrier which accepts a wide variety of vases which are employed in the floral trade and which is formed from a plastic material. The carrier configuration provides ready adaptation to a wide range of vase sizes and shapes and prevents tipping transportation and delivery of floral arrangement.

U.S. Pat. No. 4,577,753, entitled Sealed Message Carrier, issued to Joseph Marhal on Mar. 25, 1986, teaches a sealed message carrier for a message written on a piece of paper which includes a container which has a top and a bottom, a teddy bear sealed in the container, a tubular message holder carried in arms of the teddy bear, an opening in the bottom of the container for inserting the message into the holder and a tape for sealing the opening after the message has been inserted therein. The sealed message carrier may be used for delivering a personal message of congratulations on either a birthday and an anniversity.

U.S. Pat. No. 4,563,159, entitled Toy Convertible Among Multiple Configurations, issued to Kenneth B. Hills and Vlasta Cihlar on Jan. 7, 1986, teaches a toy which has multiple configurations convertible among a stuffed figurine, a stuffed tote bag with the figurine entirely contained and concealed therein and a combination figurine-tote bag with a part of the figurine located exteriorly of the tote bag.

SUMMARY OF THE INVENTION

In view of the foregoing factors and conditions which are characteristic of the prior art it is the primary object of the present invention to provide a holder for a stuffed toy animal which may be wall mounted.

It is another object of the present invention to provide a holder for a stuffed toy animal which a ribbon ties to a vase of a floral arrangement for delivery and display and which, once the ribbon has been untied, may be wall mounted.

In accordance with the present invention an embodiment of a holder for a stuffed toy animal which may be used with a floral arrangement is described. The floral arrangement includes a vase with an outer surface and a peripheral lip and flowers which are disposed in the vase. The holder includes a back frame, a base platform and two grasping arms. The back frame has a top member, a bottom member and two side members. The base platform is pivotally coupled to the bottom member of the back frame so that it can be folded against the back frame. The stuffed toy animal is placed on the base platform in an upright position relative thereto. One end of each grasping arm is pivotally coupled to one of the two side members of the back frame so that the two grasping arms may either be folded so that they are adjacent to the back frame or be swung out in order to operate together holding the stuffed toy animal in its upright position. The back frame has a pair of ribbon slits which are disposed on the side members thereof and a vase hook which is mechanically coupled to the top member thereof. A ribbon may be threaded through the ribbon slits and around the outer surface of the vase in order to tie the holder to the vase for both delivery and display. The vase hook hooks the peripheral lip of the vase. The vase hook has a screw hole so that once the ribbon has been untied the holder may be mounted on a wall by using a screw through the screw hole so that the vase hook secures the holder to the wall in order to display the stuffed toy animal.

The features of the present invention which are believed to be novel are set forth with particularity in the appended claims.

Other claims and many of the attendant advantages will be more readily appreciated as the same becomes better understood by reference to the following detailed description and considered in connection with the accompanying drawing in which like reference symbols designate like parts throughout the figures.

DESCRIPTION OF THE PREFERRED EMBODIMENT

Figure 1:
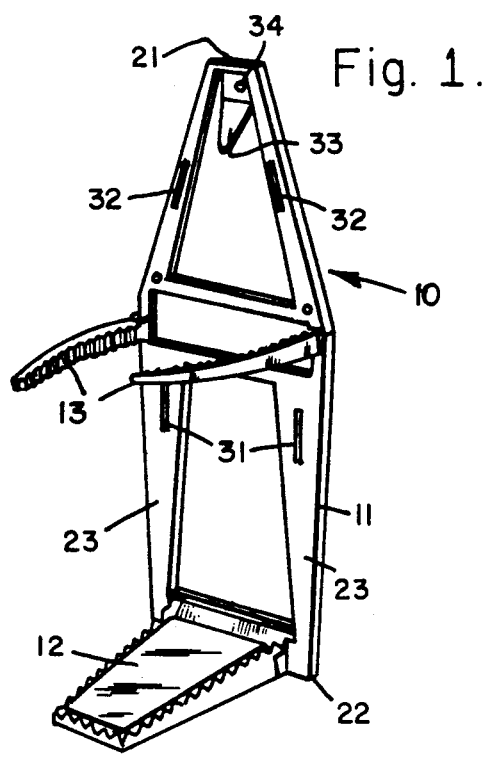
FIG. 1 is a perspective view of a holder for a stuffed toy animal which has been constructed in accordance with the principles of the present invention and which includes a back frame, a base platform and two grasping arms.

In order to understand the present invention it is necessary to refer to the following description of its preferred embodiment in conjunction with the accompanying drawing. Referring to FIG. 1 in conjunction with FIG. 2 a holder 10 includes a back frame 11, a base platform 12 and two grasping arms 13. The back frame 11 has a top member 21, a bottom member 22 and two side members 23. The base platform 12 is pivotally coupled to the bottom member 22 so that the base platform 12 may be folded against the two side members 23. One end of each grasping arm 13 is pivotally coupled to one of the two side members 23 of the back frame 11 so that the two grasping arms 23 may be folded so that they are adjacent to the two side members 23 back frame. The back frame 11 has a first pair of ribbon slits 31, a second pair of ribbon slits 32 and a vase hook 33. The first and second pairs of ribbon slits 31 and 32 are disposed on the side members 23 thereof. The vase hook 33 is mechanically coupled to the top member 21 thereof. The vase hook 33 has a screw hole 34.

Figure 3:
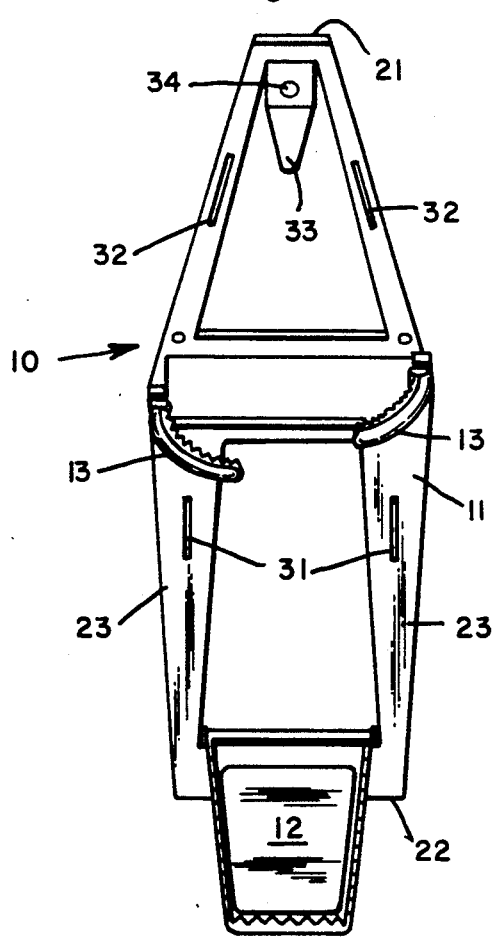
FIG. 3 is a front elevational view of the holder of FIG. 1 wherein the base platform and the two grasping arms are unfolded from against the back frame so that the a stuffed toy animal may rest on the base platform and be held by the two grasping arms.

Referring to FIG. 3 in conjunction with FIG. 1 the base platform 12 may be moved away from against the two side members 23. The two grasping arms 13 may be swung out.

Figure 2:
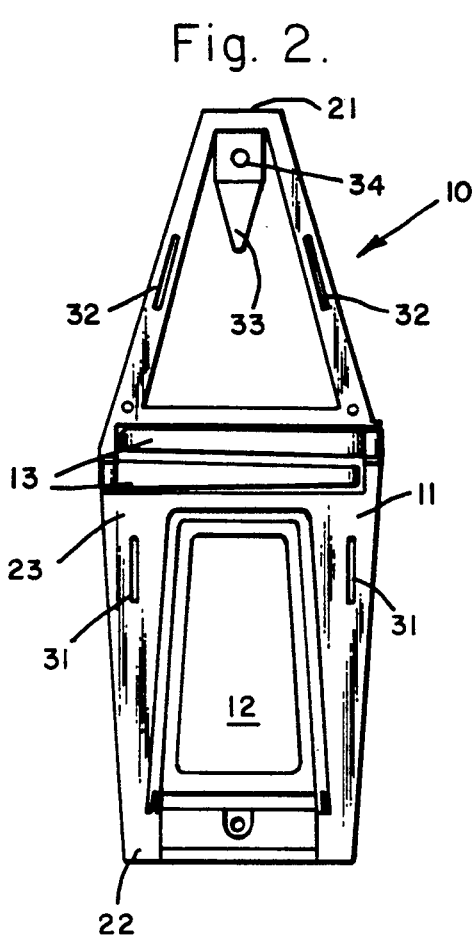
FIG. 2 is a front elevational view of the holder of FIG. 1 wherein the base platform and the two grasping arms are folded against the back frame so that the holder may easily and conveniently packaged for shipment.
Figure 4:
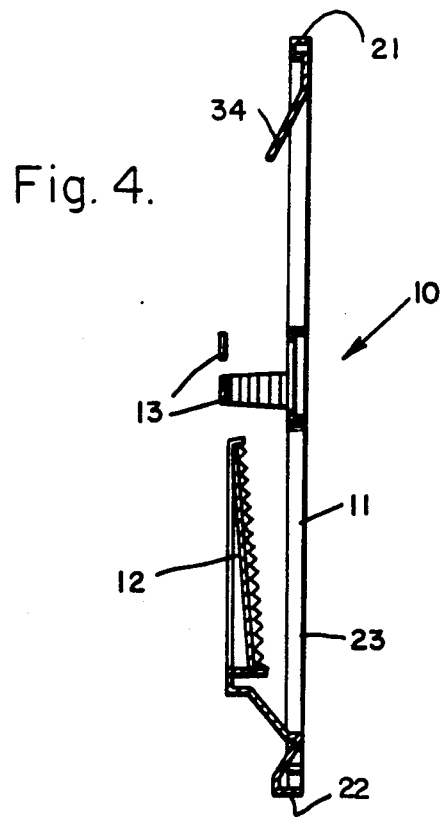
FIG. 4 is a side elevational view in cross-section of the holder of FIG. 1.

Referring to FIG. 4 in conjunction with FIG. 2 a cross-section of the holder 10 indicates that it is of an integral construction and that it may be molded out of a plastic material. The holder 10 is easy and inexpensive to manufacture.

Figure 5:
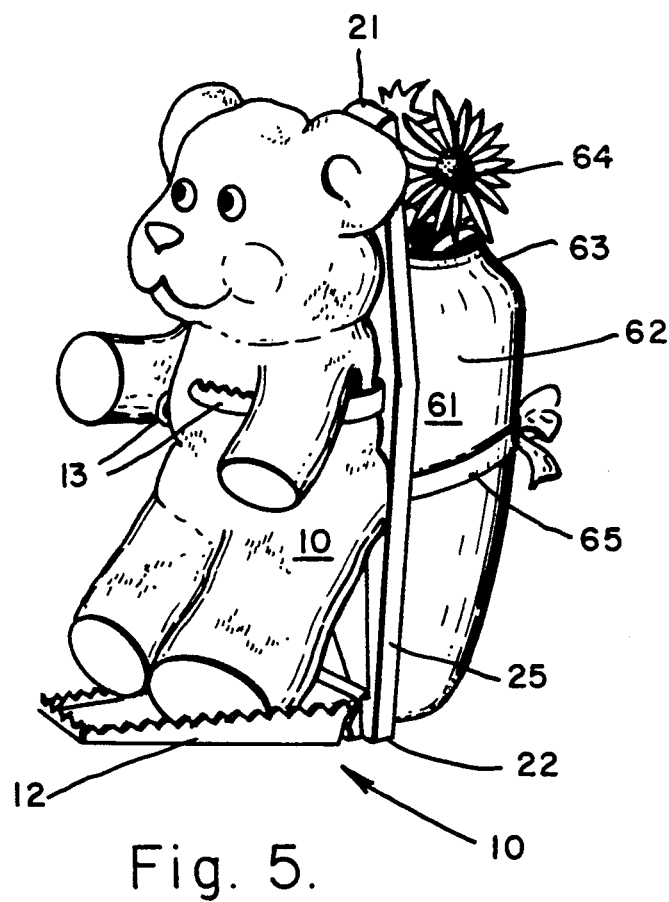
FIG. 5 is a perspective view of the holder of FIG. 1 wherein the holder is holding a stuffed toy animal and is attached to a floral arrangement which includes a vase and flowers.

Referring to FIG. 5 in conjunction with FIG. 1 a stuffed toy animal 50 is placed on the base platform 12 in an upright position relative thereto. The two grasping arms 13 operate together to hold the stuffed toy animal 50 in its upright position. The holder 10 may be used with a floral arrangement 60. The floral arrangement 60 includes a vase 61 with an outer surface 62 and a peripheral lip 63 and flowers 64 which are disposed in the vase 61. A ribbon 65 is threaded through the first pair of ribbon slits 31 and around the outer surface 62 of the vase 61 in order to tie the holder 10 to the vase 61 for both delivery and display. The vase hook 33 hooks the peripheral lip 63 of the vase 61. The vase hook has a screw hole so that once the ribbon has been untied the holder may be mounted on a wall by using a screw through the screw hole so that the vase hook secures the holder to the wall in order to display the stuffed toy animal 50.

From the foregoing it can be seen that a holder for a stuffed toy animal which may be used with a floral arrangement has been described. It should be noted that the sketches are not drawn to scale and that distance of and between the figures are not to be considered significant.

Accordingly it is intended that the foregoing disclosure and showing made in the drawing shall be considered only as an illustration of the principles of the present invention.

What is claimed is:

1. A holder for a stuffed toy animal for use with a floral arrangement which includes a vase with an outer surface and a peripheral lip and flowers which are disposed in the vase, said holder comprising:
   a. a back frame having a top member, a bottom member and two side members which have a pair of ribbon slits disposed thereon whereby a ribbon is threaded through said ribbon slits and around the outer surface of the vase in order to tie said holder to the vase for both delivery and display;
   b. a base platform which is mechanically coupled to said bottom member of said back frame and on which the stuffed toy animal is placed in an upright position relative to said base platform;
   c. holding means for holding the stuffed toy animal in its upright position, said holding means being mechanically coupled to said two side members of said back frame; and
   d. vase hooking means for hooking the peripheral lip of the vase, said vase hooking means being mechanically coupled to said top member of said back frame and having a screw hole so that once the ribbon has been untied said holder may be mounted on a wall by using a screw through said screw hole so that said vase hooking means secures said holder to the wall in order to display the stuffed toy animal.

* * * * *